United States Patent
Choiniere

(10) Patent No.: US 11,195,285 B2
(45) Date of Patent: Dec. 7, 2021

(54) MOVING OBJECT DETECTION USING A DIGITAL READ-OUT INTEGRATED CIRCUIT AND DEGREE OF POLARIZATION AND ANGLE OF POLARIZATION AT THE PIXEL LEVEL

(71) Applicant: BAE SYSTEMS Information and Electronic Systems Integration Inc., Nashua, NH (US)

(72) Inventor: Michael J. Choiniere, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/837,390

(22) Filed: Apr. 1, 2020

(65) Prior Publication Data
US 2021/0312639 A1    Oct. 7, 2021

(51) Int. Cl.
*G06T 7/254* (2017.01)
*G06T 7/207* (2017.01)
*G06T 7/285* (2017.01)

(52) U.S. Cl.
CPC .............. *G06T 7/207* (2017.01); *G06T 7/254* (2017.01); *G06T 7/285* (2017.01)

(58) Field of Classification Search
CPC .......... G06T 7/207; G06T 7/254; G06T 7/285
See application file for complete search history.

(56) References Cited

U.S. PATENT DOCUMENTS

| 2007/0247553 | A1* | 10/2007 | Matusik | H04N 9/74 348/595 |
| 2012/0075513 | A1* | 3/2012 | Chipman | G01J 4/04 348/302 |
| 2018/0124378 | A1* | 5/2018 | Forutanpour | G06T 5/005 |
| 2020/0387742 | A1* | 12/2020 | Steenhoek | G06T 7/90 |

* cited by examiner

*Primary Examiner* — Dave Czekaj
*Assistant Examiner* — Berteau Joisil
(74) *Attorney, Agent, or Firm* — KPIP Law, PLLC; Scott J. Asmus

(57) ABSTRACT

An object detection system comprises a polarizer configured to polarize an incoming image scene, a motor controller configured to control a spin rate of the polarizer, a lens configured to collect scene data from the polarized image scene, a first integrated circuit configured to measure the collected scene data at two different and orthogonal polarizations, a second integrated circuit configured to determine a degree of polarization (DoP) and an angle of polarization (AoP) for each image frame pair and to generate pre-processed data, and a processor configured to match the pre-processed data to target criteria. The first integrated circuit can be a DROIC imager and the second integrated circuit can be a FPGA. The AoP and DoP can be determined at a pixel level. The second integrated circuit is configured to apply spatial filtering having a DoP greater than 70% or where AoP is unique to immediate surroundings of AoP.

15 Claims, 5 Drawing Sheets

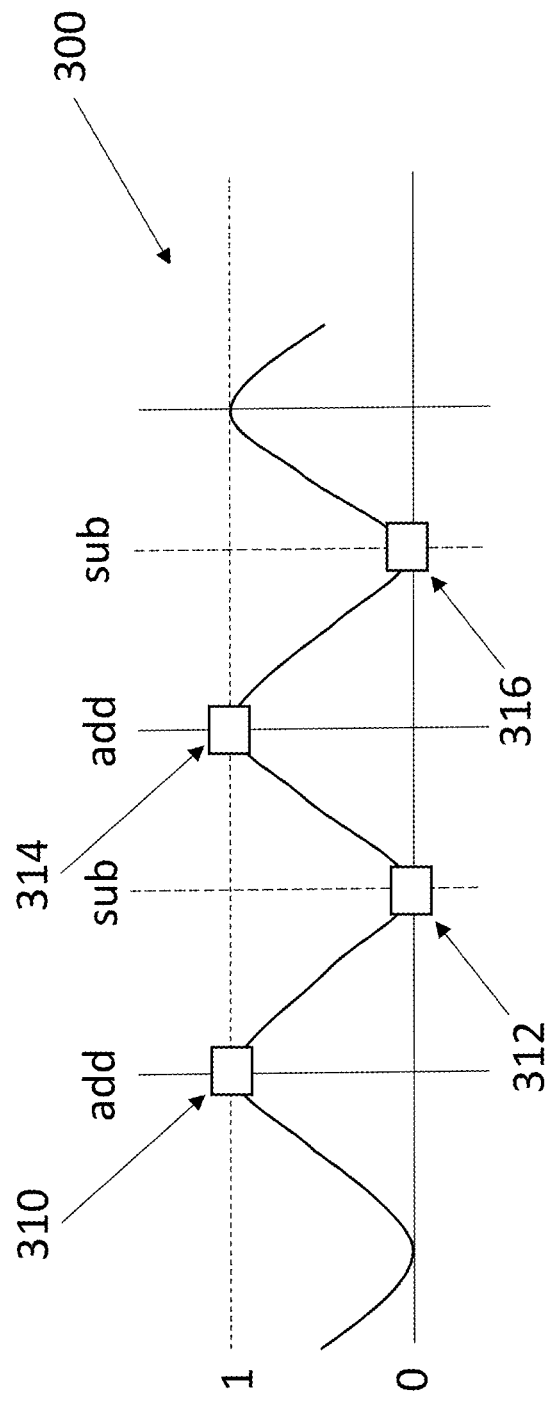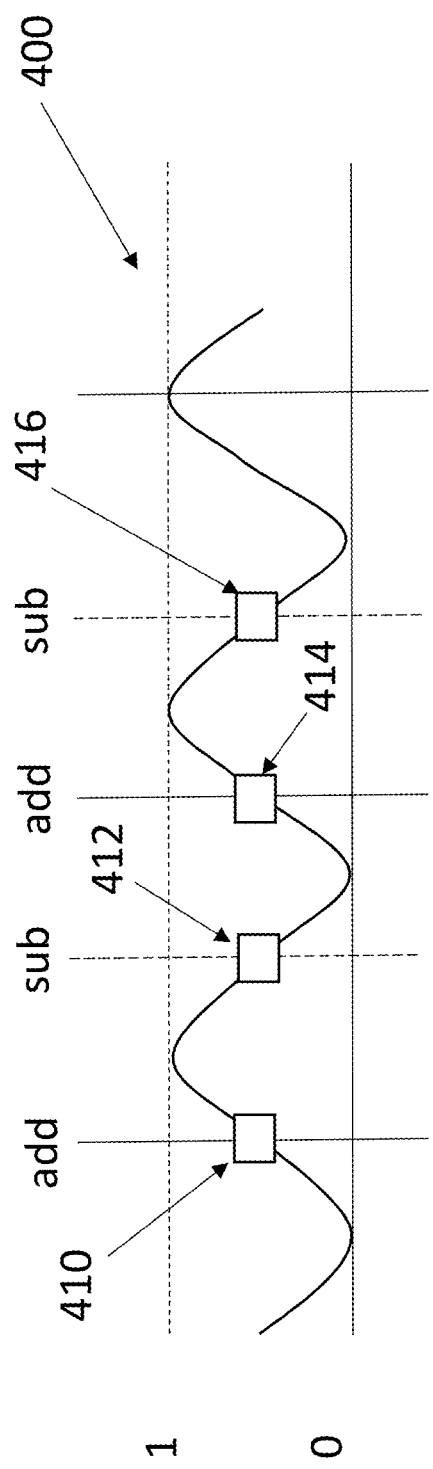

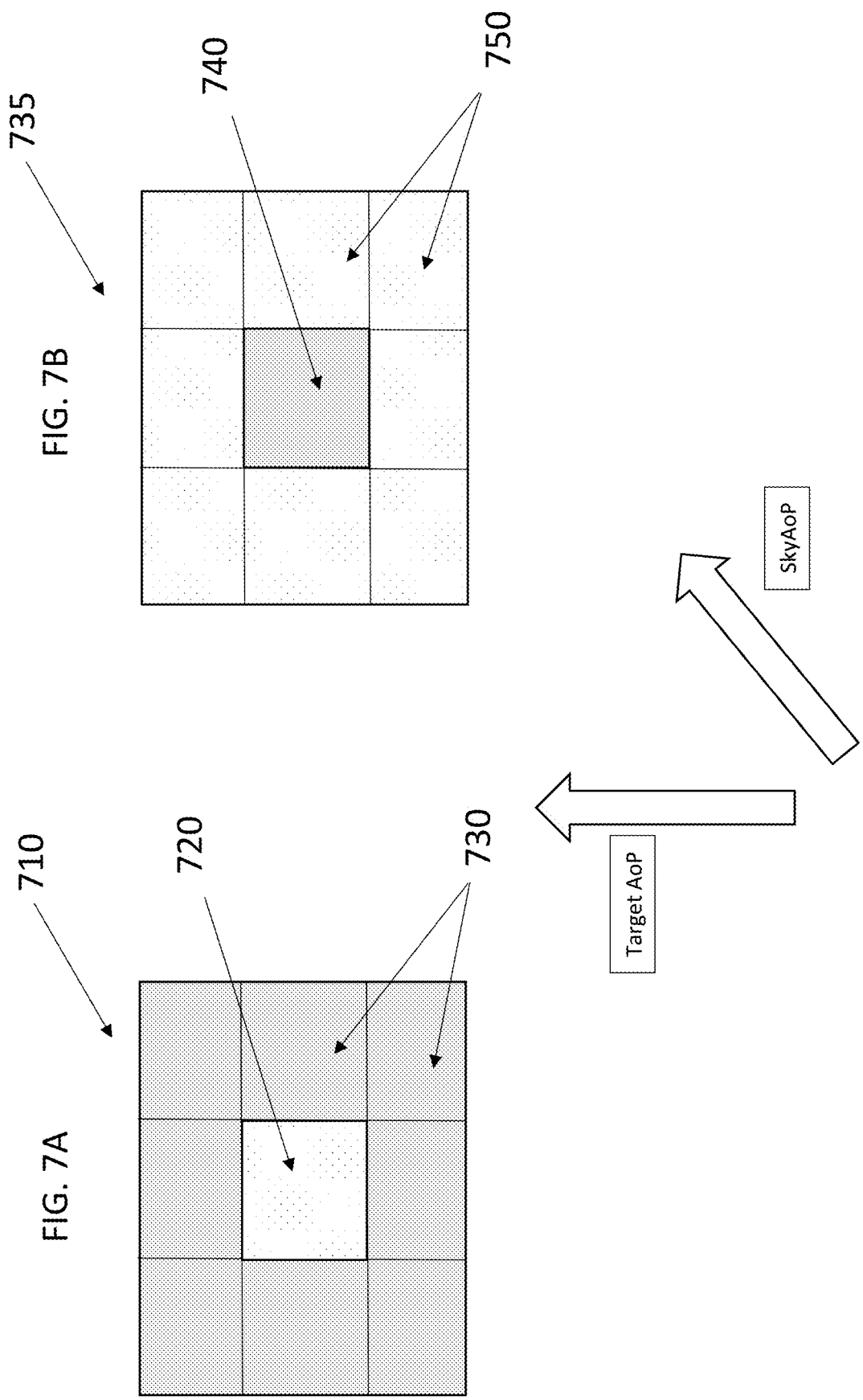

MOVING OBJECT DETECTION USING A DIGITAL READ-OUT INTEGRATED CIRCUIT AND DEGREE OF POLARIZATION AND ANGLE OF POLARIZATION AT THE PIXEL LEVEL

FIELD OF THE DISCLOSURE

The present disclosure relates to the detection of moving objects and more particularly to the use of degree of polarization and angle of polarization at the pixel level to detect moving objects in a scene.

BACKGROUND OF THE DISCLOSURE

Current methods of moving object detection rely on simple contrast measurements coupled with software to identify the moving/hovering object, e.g. an unmanned aerial system (UAS). The cost of the optics and processing drives up the cost of the system because current contrast measurements are not sufficient for accurate identification. For example, a bird at a distance of 1 Km can look similar enough to a UAS at a distance of 5 Km to provide an inaccurate identification as target. High-resolution images are needed to differentiate between the two driving the size, weight, power and cost (SWaP-C) of the system. The high resolution would require larger, heavier optics with larger format imagers (1920 frame) to provide sufficient FOV and pixel on target to identify the object; at least 10 to 15 pixel across the target image.

Wherefore it is an object of the present disclosure to overcome the above-mentioned shortcomings and drawbacks associated with the conventional target tracking.

SUMMARY OF THE DISCLOSURE

One aspect of the present disclosure is an object detection system comprising: a polarizer configure to polarize an incoming image scene, and to generate a polarized image scene; a motor controller configured to control a spin rate of the polarizer; a lens configured to collect scene data from the polarized image scene, the scene data including a plurality of image frames; a first integrated circuit configured to measure the scene data collected from the polarized image scene such that each image frame pair of the scene data collected from the polarized image scene is collected at two different and orthogonal polarizations; a second integrated circuit configured to determine a degree of polarization (DoP) and an angle of polarization (AoP) for each image frame pair, to apply spatial filtering to the DoP and AoP for each image frame pair, and to generate pre-processed data as a result of the spatial filtering; and a processor configured to match target criteria using the pre-processed data received from the FPGA.

One embodiment of the object detection system is wherein the first integrated circuit comprises a digital read-out integrated circuit (DROIC) imager and wherein the second integrated circuit comprises a field-programmable gate array (FPGA).

Another embodiment of the object detection system is wherein the second integrated circuit is configured to: determine the DoP by processing at least two image frame pairs of the plurality of image frames; and determine the AoP for the at least two frame pairs based on the position of the polarizer received at the second integrated circuit from the motor controller.

In some cases, processing the at least two image frame pairs comprises adding a first frame of the first image frame pair to a first frame of the second image frame pair and subtracting a first frame of the first image frame pair from a second frame of the second image frame pair, the second image frame being consecutive with respect to the first image frame. In certain embodiments, the second integrated circuit is integral with the processor.

Yet another embodiment of the object detection system is wherein the AoP and DoP are determined at a pixel level such that each pixel is analyzed. In some cases, the polarizer is delayed by 180-degrees of rotation by the motor controller to determine the AoP. In some embodiments, the polarizer is rotated by 360-degrees by the motor controller for each 0.5 seconds of search performed by the first integrated circuit.

Still yet another embodiment of the object detection system is wherein the spatial filter is searching for targets having the DoP greater than 70%, targets that meet an expected dimension, or targets where the AoP is unique with respect to immediate surroundings of the AoP. In some cases, the first integrated circuit uses an image processing construct using cluster filters for contrast on each frame for 1-by-1-pixel clusters or 2-by-2-pixel clusters. In certain embodiments, a shift in the AoP and the DoP measurement will indicate the level of target detection confidence.

Another aspect of the present disclosure is a method comprising: spinning a polarizer, by a motor controller, at a rate that is slightly out of phase with respect to an image frame rate of an imager of a first integrated circuit; acquiring a plurality of image frame pairs by the imager of the first integrated circuit, each image frame pair having a first image frame and a second image frame; determining a degree of polarization (DoP) and an angle of polarization (AoP) for each image frame pair; applying a spatial filter to both the DoP and AoP for each image frame pair to provide filtered images; and matching the filtered images to targeting criteria.

One embodiment of the method is wherein determining the DoP comprises adding the first frame of the first image frame pair to the first frame of the second image frame pair and subtracting the first frame of the first image frame pair from the second frame of the second image frame pair, the second image frame being consecutive with respect to the first image frame In some cases, determining the AoP for each image frame pair is based on the position of the polarizer. Certain embodiments of the method further comprise delaying the polarizer by 180-degrees of rotation with respect to an image acquisition rate of the imager of the first integrated circuit.

Yet another aspect of the present disclosure is an object detection system comprising: a first integrated circuit configured to measure scene data collected from a polarized image scene in which each image frame pair of the scene data from the polarized image scene is collected at two different and orthogonal polarizations; a second integrated circuit configured to determine a degree of polarization (DoP) and an angle of polarization (AoP) for each image frame pair, to apply spatial filtering to the DoP and AoP for each image frame pair, and to generate pre-processed data as a result of the spatial filtering; and a processor configured to match the pre-processed data to target criteria.

One embodiment of the object detection system further comprises a polarizer configured to polarize an incoming image scene, and to generate the polarized image scene; a motor controller configured to control a spin rate of the polarizer; and a lens configured to collect the scene data from the polarized image scene, the scene data including a plurality of image frames.

Another embodiment of the object detection system is wherein the first integrated circuit comprises a digital read-out integrated circuit (DROIC) imager and wherein the second integrated circuit comprises a field-programmable gate array (FPGA), Yet another embodiment of the object detection system is wherein the second integrated circuit is configured to: determine the DoP by processing at least two image frame pairs of the plurality of image frames, the processing including adding a first frame of the first image frame pair to a first frame of the second image frame pair and subtracting a first frame of the first image frame pair from a second frame of the second image frame pair; and determine the AoP for the at least two frame pairs based on the position of the polarizer received at the second integrated circuit integrated circuit from the motor controller. In some cases, the polarizer is delayed by 180-degrees by the motor controller of rotation to generate the AoP.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 3 shows a series of image capture events according to the principles of the present disclosure.

FIG. 4 shows a second series of image capture events according to the principles of the present disclosure.

FIG. 7A shows a frame with contrast image processing according to the principles of the present disclosure.

FIG. 7B shows a second frame with contrast image processing according to the principles of the present disclosure.

DETAILED DESCRIPTION OF THE DISCLOSURE

Figure 1:
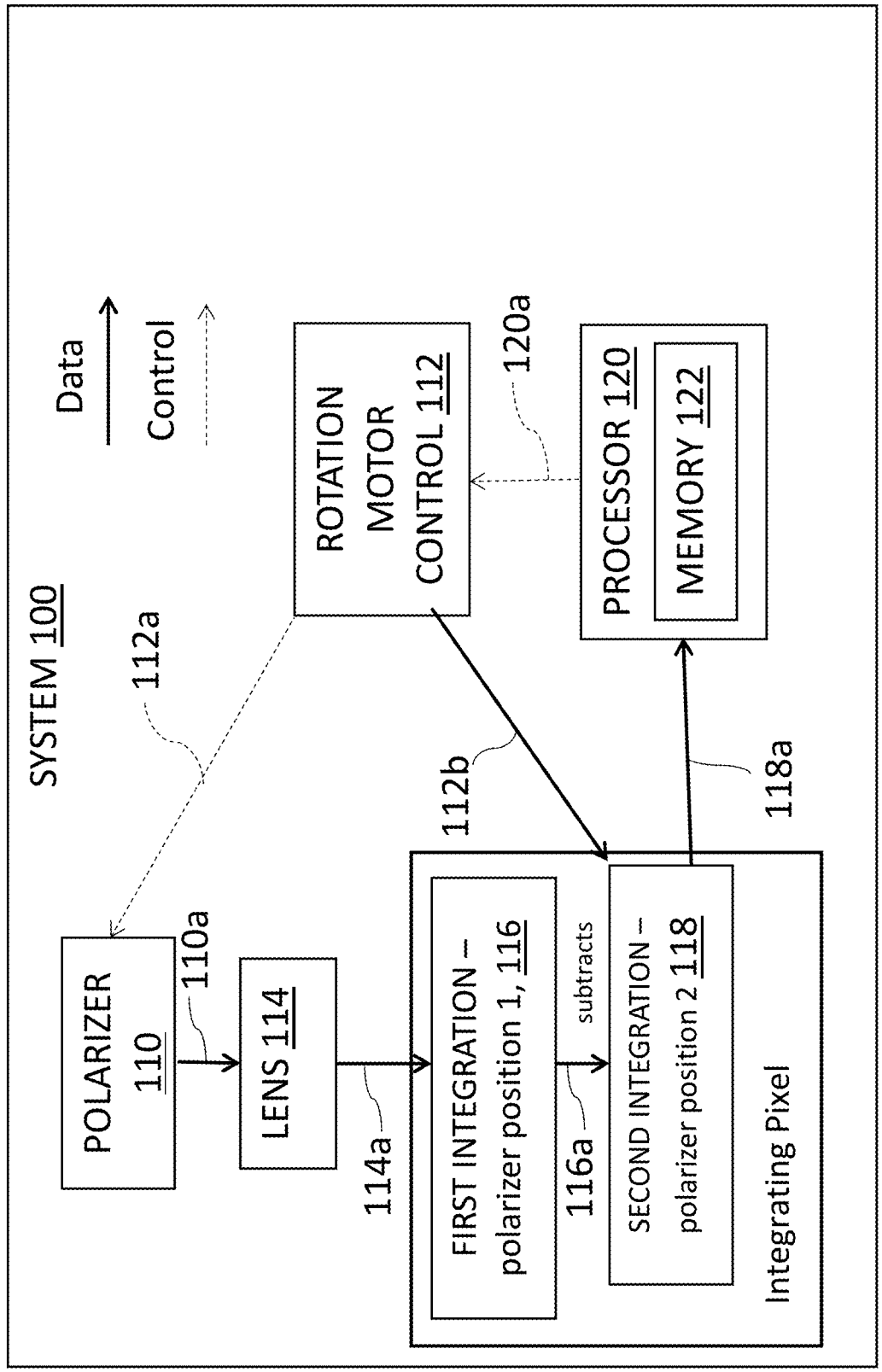
FIG. 1 shows a block diagram of one embodiment of a system of the present disclosure.

FIG. 1 shows a block diagram of one embodiment of a system 100 of the present disclosure. The system 100 can be a target detection system or other munition guidance or control system. The system 100 is configured to track and image a target or perform other moving object detection. In some instances, it may be difficult, for example, to differentiate between various objects in a field of view as the objects come into, and go out of, the field of view. For example, depending upon the size, a bird could appear to be the same as an airplane or a UAS to some imaging systems. By implementing the system 100, the target declaration and tracking can be improved. The system 100 includes a polarizer 110 under control by a rotation motor control 112, a lens 114, a first integrated circuit 116 (for example, a DROIC imager), a second integrated circuit 118 (for example, a field-programmable gate array, or FPGA), and a processor 120 that can include memory 122.

The rotation motor control 112 is configured to send a control signal 112a to the polarizer 110 to generate the correct spin rate and positional timing for the polarizer 110. The polarizer 110 is configured to polarize the scene collected energy of a scene to generate a polarized image scene. The lens 114 is configured to collect scene data 110a from the polarizer 110. The scene data can include a plurality of image frames. The first integrated circuit 116 receives the measured scene energy 114a from the lens 114 and images the measured scene energy at two different and orthogonal polarizations. The first IC 116 can be a DROIC imager 116 that provides the collected scene data 116a at two different and orthogonal polarizations to the second IC 118. The first IC 116 can be configured to measure the scene data collected from the polarized image scene, such that each image frame pair of the scene data collected from the polarized scene is collected at two different and orthogonal polarizations.

The second IC 118 (which may be an FPGA) determines an Angle of Polarization (AoP) and a Degree of Polarization (DoP) for each image frame. For example, by observing 15 image frame pairs, a composite of the AoP and DoP for the entire scene can be generated. The position of the polarizer at the time of measurement is provided to the second IC 118 from the rotation motor control 112. The position of the polarizer is provided to the second IC 118 via 112b and data via 112b from the motor control 112 is used by the second IC 118 to indicate the AoP. The second IC 118 also applies a spatial filter to the AoP and DoP for each image frame pair to generate pre-processed data as a result of the spatial filtering. By applying spatial filters to both the DoP and AoP anomalies in the image scan be identified and matching target criteria for overall size using the filtered data. The filtered data, AoP and DoP are provided as pre-processed data at 118a to the processor 120. The processor 120 then matches the filtered AoP and DoP to the target criteria (e.g., stored in memory 122) to declare and track targets using the system 100. The combination of AoP and DoP allows FPGAs implementing simple algorithms to be utilizes in compact systems in a few cubic inches and consuming only a few watts of power. It will be appreciated that in some instances, for example where power consumption is not problematic, the principles of the present disclosure could be applied to a system having only a processor, without the first and second integrated circuit, and implementing the polarization, motor control, and processing techniques according to the present disclosure. The processor 120 can be configured to control the rotation motor control 112 via control signal 120a. In some embodiments, the second IC 118 can be integral with the processor 120 or otherwise part of the processor 120.

Figure 6:
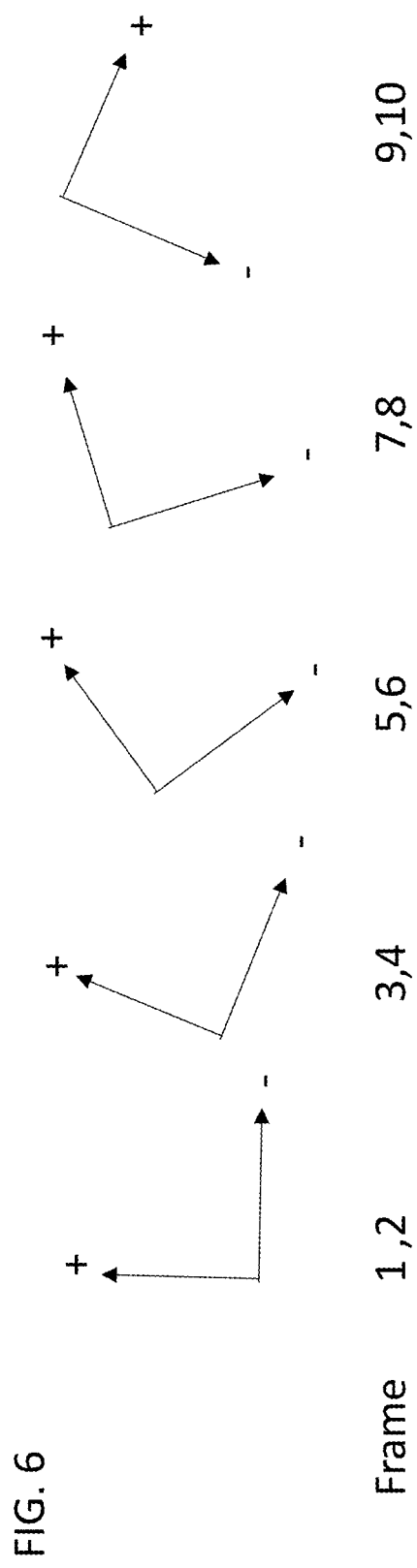
FIG. 6 shows a series of frames according to the principles of the present disclosure.

One embodiment of the target detection system, for example system 100 of the present disclosure, utilizes a digital read-out integrated circuit (DROIC) imager 116. In certain embodiments, the DROIC is electro-optical. In certain embodiments, the DROIC is short-wave infrared (SWIR), mid-wave infrared (MWIR), or the like. The target detection system of the present disclosure further includes an out of phase rotating polarizer 110 to measure the Degree of Polarization (DoP) and the Angle of Polarization (AoP) at the pixel level such that each pixel is analyzed. By using the DROIC 116 in concert with the rotating polarizer 110, objects in the field that reflect polarized light with sum with each frame collected as illustrated in FIG. 3. The signal can build for every frame since the polarizer is aligned (add the light amplitude) with the polarized light and the next frame is orthogonal to the light (subtract light amplitude ~0). The collected polarized light is summed in the DROIC imager 116. Natural items in the scene tend not to be polarized, in figure two is each frame contain about equal levels of collected polarized light, thereby cancelling each other as the frame pairs are summed. By placing the rotation of the polarized light out phase with the frame rate of the imager, the frame pairs slowly walk through all orientations of the polarized light as illustrated in FIG. 6. The highest amplitude record indicates the Degree of Polarization (DoP) and the angle of the at which the high DoP is recorded is the Angle of Polarization (AoP). Since the DROIC 116 is doing the pixel sum from frame pair to frame pair, the downstream FPA procession is greatly simplified, preforming only threshold and the DoP, spatial filtering and AoP mapping of the anomaly.

In one embodiment of the system of the present disclosure, the output from the DROIC with the measured DoP and AoP for each pixel in the imager represents a signal signature with an amplitude vector based on the particular polarization position, thereby allowing a search for a target within a scene based on pixel amplitude relative to the amplitude of neighboring pixels. In one embodiment, a spatial contrast filter applied at the processing level to limit the pixel groupings to target sized structures is used to identify the pixel clusters with the highest DoP (>70%) relative to its neighboring pixels (having lower DoP<30%). In this manner, the pixel with the highest DoP relative to its neighboring pixels having lower DoP can be identified using a simple spatial filter.

In certain embodiments of the system of the present disclosure, real-time processing of the DROIC output with both DoP and AoP information is obtained via a field programmable gate array (FPGA). In some cases, the system is used for UAS detection and uses contrast or edge sharpening algorithms to enhance the imagery, reduce blurring or smearing due to motion of the weapon, targeting system or ISR asset. The UAS detection with a real-time, low cost FPGA, thereby reducing the size, weight, power and cost (SWaP-C) for the system. In some embodiments, a contrast FPGA kernel using DoP and the AoP results, combined with spatial target dimensions can be constructed to utilize a match filter to identity targets.

The system of the present disclosure solves important technological problems including, but not limited to, how to detect a UAS at 2 to 5 Km using EO detection techniques; how to differentiate between a UAS and birds at 500 to 1000 meters; given a 1-by-1 or 2-by-2 pixel spatial subtend, how to determine if a moving object is a UAS or a bird; and how to lower the overall cost of the system using optics with an iFOV between 100 to 300 μrads. In one embodiment, the system has a 640 pixel frame size with each pixel at 100 μrads (3.6° to 11°). In some cases, a one meter long UAS at 100 μrads is about 2 pixels at 5 Km. In one embodiment of the system, the resolution at 300 μrads is <1 pixel.

Certain embodiments of the system of the present disclosure have the ability to detect a UAS using an EO/IR imager with a DROIC to detect a UAS even if the UAS spatial extent is only a 1-by-1 or 2-by-2 pixel cluster, while simultaneously differentiating from birds at shorter distances using contrast measurements. In one embodiment, a low DoP signal eliminates birds, and a high DoP coupled with an AoP unmask the UAS against a high DoP background (e.g., sky). In some cases, a polarization measurement determines natural (bird) versus man-made (UAS). In some embodiments, the background (e.g., the sky) is high polarized much like the target so measuring the DoP is not sufficient, and AoP is needed to provide the final discrimination needed for proper target identification.

One embodiment of the system of the present disclosure uses a DoP coupled with an AoP to search the background in a scene for a polarized reflecting target (e.g., UAS) against a varying DoP background, e.g., sky line. As the imager scans the sky, the sky DoP varies from low to high. In certain embodiments, the AoP is well known and, more importantly, monotonic. In some cases, the background and the moving target may have close DoP measurements, but they are more than likely to be at different AoP, which can be detected using real time, on-the-fly sorting filter. UAS generally have relatively high polarization features, but there are areas in the sky that might as well. A simple DoP measurement may yield poor contrast and thereby mask the UAS. By coupling the AoP to the DoP measurement the UAS can be unmasked. It is understood that birds are not polarization reserving reflectors, and as such their low DoP measurement could be used to declare a false alarm.

Figure 2:
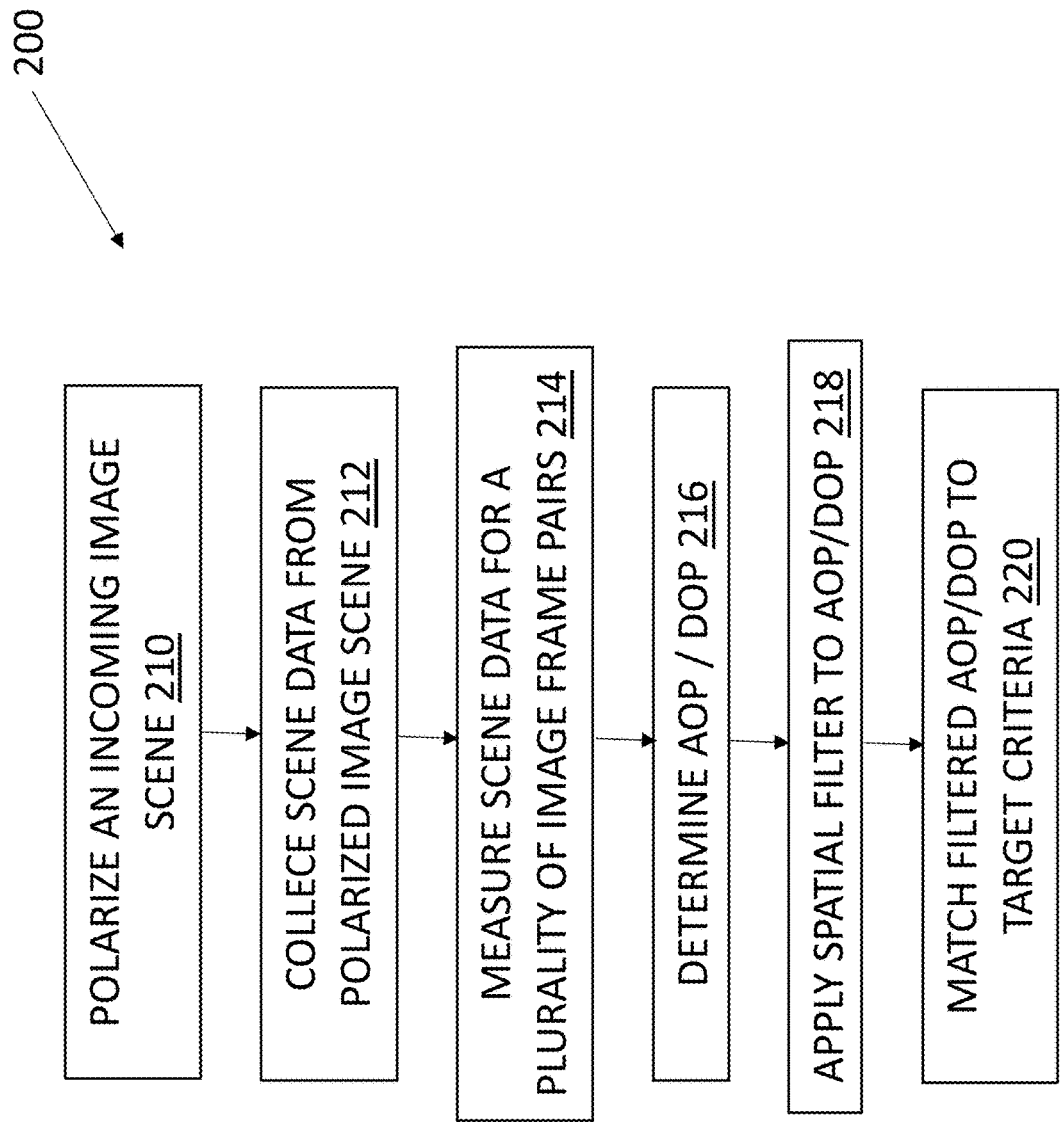
FIG. 2 shows a flow chart of one embodiment of a method according to the principles of the present disclosure.

A method, as illustrated in one embodiment in FIG. 2, can be carried out according to the system of FIG. 1, for example. The method can implement the target tracing system 100 of FIG. 1 to match a potential target to target criteria. It will be appreciated that systems other than those depicted in FIG. 1 can be configured to carry out the method 200 of FIG. 2.

According to the method 200, at block 210 an incoming image scene is polarized. For example, the image scene can be polarized by the polarizer 110 shown in FIG. 1. At block 212, scene data is collected from the polarized image scene by a lens (e.g., lens 114 shown in FIG. 1). The polarized image scene data is then provided to a first integrated circuit, which for example can be the DROIC imager 116 shown in FIG. 1. At block 214, the scene data is measured for a plurality of image frame pairs by the first integrated circuit (e.g., DROIC imager 116). The DROIC imager can be configured to measure the scene energy at two different and orthogonal polarizations.

At block 216, the AoP and DoP are determined by a second integrated circuit, which for example may be the FPGA 118 shown in FIG. 1. At block 218, a spatial filter is applied to the AoP and DoP, which for example can likewise be performed by the second integrated circuit, which may be the FPGA 118 shown in FIG. 1. At block 220, the filtered AoP and DoP are matched to target criteria to identify and track a target within the field of view of the lens of the system. The matching can be performed, for example, by the processor 120 shown in FIG. 1 implementing the memory 122 having stored target criteria thereon for comparison to the calculated target criteria.

It will be appreciated that in some embodiments the DROIC imager can be optional (and, thus, omitted) so that the processing is performed by the processor after filtering by the FPGA. In such an implementation, the image data would not be "pre-processed" and rather all processing would occur by the filter and processor (e.g., processor 120 shown in FIG. 1). This implementation would require a significant amount of processing power and would lag in real time target declaration and tracking.

In some cases, the background is the sky. In some cases, the background is the ground. In certain embodiments, the background is water. In certain embodiments, the moving target is a UAS, or a land or water vehicle. In some cases, the target is a round. As used herein, a round is a weapon, a projectile, a ballistic, a bullet, a munition, or a guided weapon.

In certain embodiments, ship detection is possible where the water is highly polarized and so is the ship. The key difference is the AoP will consistent for the flat, horizontal water whereas the ship has vertical features which will be in stark contrast when measuring the AoP. In certain cases, it may be possible to detect an UAS in the trees.

Referring to FIG. 3, a series of image capture events 300 according to the principles of the present disclosure is shown. More specifically, the DROIC can add and subtract in a camera frame having two states. In FIG. 3, the series of image capture events 300 are in phase. In FIG. 4, the series of image capture events 400 are out of phase. Using the DROIC, one embodiment of the system adds and subtracts image events (i.e., total energy captures during the relevant time event) and are valued between 0 and 1. The image events are indicated by boxes 310, 312, 314, 316. When the spinning polarizer is aligned to a polarization, the DoP is measured and the AoP is determined by the polarizer's angular position at the time of the measurement. The polarizer's angular position at the time of measurement can be provided by the motor control (e.g., 112) to the first integrated circuit (e.g., DROIC imager 116). In one embodiment, the Max DoP and the AoP is determined on a pixel by pixel basis. In this example, the operation results in two operations: add two peaks 310 and 314 (amplitude of +1 and +1) and subtract two amplitudes 312 and 316 at zero. As the polarizer moves out of angular phase with the scene, the DoP will reduce (see FIG. 4).

Referring to FIG. 4, a second series of image capture events 400 according to the principles of the present disclosure is shown. More specifically, in one embodiment the polarizer is normally rotating at 60 Hz or 3600 RPM, and over a one second duration the polarizer is retarded or delayed by 180° of rotation to generate the AoP search. In other embodiments, it could be 360° for a 0.5 second search (or shorter) depending on the accuracy of the measurement needed. Meaning, the polarizer is rotated by 360-degrees by the motor controller for each 0.5 seconds of search performed by the first integrated circuit. In this example the DoP is close to zero since the synchronized polarizer angle at the image capture events (boxes 410, 412, 414, 416) are at the same amplitude levels, thereby cancelling each other out in the resulting summation. This indicates no DoP at this specific AoP defined by the position of the polarizer.

Figure 5:
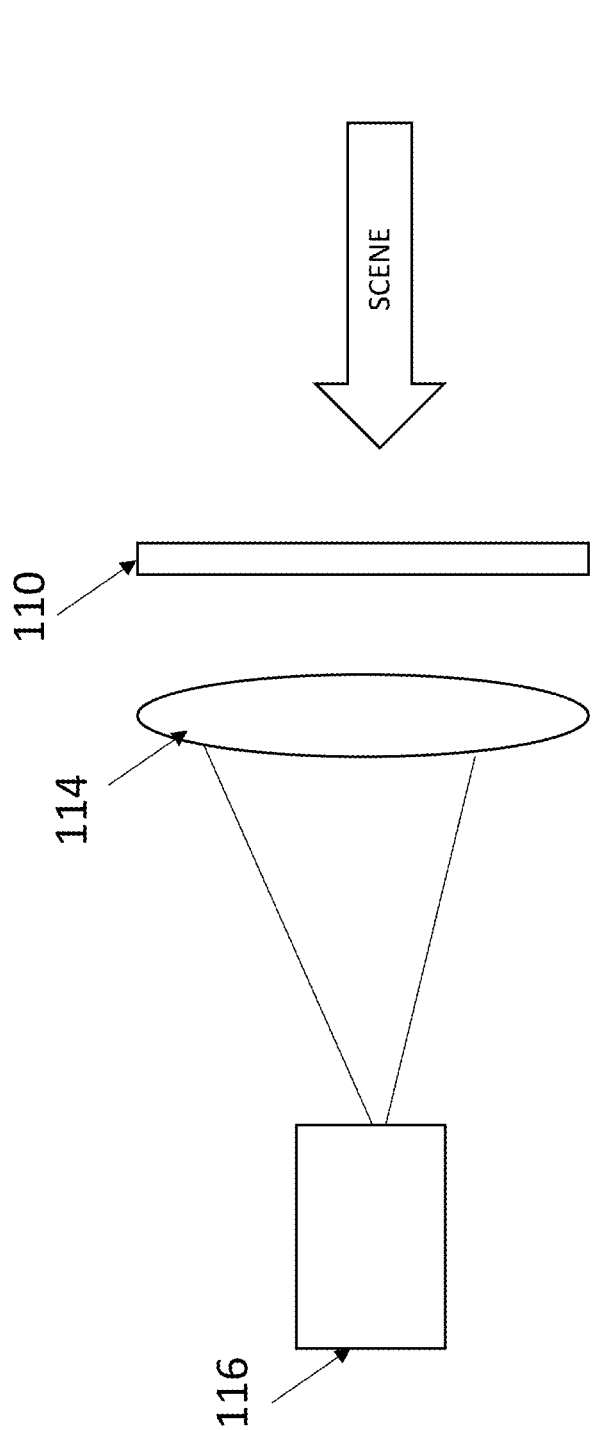
FIG. 5 shows a diagrammatic view of one embodiment of the system of the present disclosure.

Referring to FIG. 5, a diagrammatic view of one embodiment of the system of the present disclosure is shown, with the components aligned in an example orientation. More specifically, an imager 116 is coupled with a slightly out of phase rotating polarizer 110 via a lens 114 or other optics. The processor (e.g., processor 120 in FIG. 1, not shown in FIG. 5) controls the position of the polarizer thru the polarization rotation motor controller (e.g., controller 112 in FIG. 1, not shown in FIG. 5). As the scene energy is collected, the polarizer angular position is noted and an FPGA generates DoP and AoP measurements as depicted in FIGS. 3 and 4. The DROIC imager 116 provides the means for summing two samples between two frames of data. This data then passing thru a FGPA spatial filter (e.g., FPGA 118) looking for targets with high DoP (>70%), target meets expected dimension (spatial filter) and AoP unique to the immediate surroundings (clutter rejection—object different from back ground). The data frames are passed to a processor (e.g., 120 of FIG. 1, not shown in FIG. 5) for target tracking using AoP and DoP as criteria, as well as speed and rotation positon of the polarizer relative to the imager's frame capture.

Referring to FIG. 6, a series of frames 1-5 according to the principles of the present disclosure is shown. More specifically, each pixel in the imager sees a plurality of different polarization states, and each frame is used to determine if a particular target pixel is polarized or not. The DROIC adds and subtracts the vectors in each frame, as noted with + and −. This covers the entire polarization scheme, where the normal environment (rocks, trees, etc.) are 0s and polarized objects come back as 1. This provides for removal of the natural background in a scene.

Referring to FIG. 7A, a frame 710 with contrast image processing according to the principles of the present disclosure is shown. More specifically, one embodiment of the system processes the DROIC with a standard contrast image processing FPGA construct. Using cluster filters for contrast on each frame for 1-by-1 or 2-by-2 clusters. The output is tied to the frame number corresponding to the rotation position of the polarizer. In one embodiment, a shift in the AoP (angle of polarization) and the DoP (degree of polarization) measurement will indicate the level of target detection confidence. This image processing approach lowers cost and decreases real time detection to less than 1 second. FIG. 7A shows a frame 710 where the target 720 (e.g. UAS) has been identified by having a high DoP at the specific AoP. Here, the target is highlighted when the polarizer corresponding to FIG. 6, frames 1 (matches) and 2 (orthogonal) to the direction of the target's AoP. The background 730 (e.g., sky) may have a high DoP but not at this specific AoP. The highest DoP for the background is a different AoP than the target's AoP. Thus, the DoP will yield a low reading for the sky at this AoP as compared to the UAS—in FIG. 7A.

Referring to FIG. 7B, a second frame 735 with contrast image processing according to the principles of the present disclosure is shown. More specifically, the sky 750 has a high DoP at this specific AoP when using FIG. 6, frame 5 (matches) and 6 (orthogonal), thus the DoP will yield a high reading as compared to the UAS target 740 which has a low DoP at this AoP. Each pixel in the array, if polarized will yield a high DoP for a specific FIG. 6 frame set (1,2; 3,4; 5,6; . . . ). If unpolarized, all DoP measures will be about equal, regardless of polarizer orientation. If polarized, one frame set will generate a highest DoP measurement and that will correspond to a specific rotation set/angle of the polarizer.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. An object detection system comprising:
   a polarizer configured to polarize an incoming image scene, and to generate a polarized image scene;
   a motor controller configured to control a spin rate of the polarizer;
   a lens configured to collect scene data from the polarized image scene, the scene data including a plurality of image frames;
   a digital read-out integrated circuit (DROIC) imager configured to measure the scene data collected from the polarized image scene such that each image frame pair of the scene data collected from the polarized image scene is collected at two different and orthogonal polarizations;
   a field-programmable gate array (FPGA) configured to determine a degree of polarization (DoP) and an angle of polarization (AoP) for each image frame pair, to apply spatial filtering to the DoP and AoP for each image frame pair, and to generate pre-processed data as a result of the spatial filtering; and
   a processor configured to match target criteria using the pre-processed data received from the FPGA,
   wherein the FPGA is configured to:
      determine the DoP by processing at least two image frame pairs of the plurality of image frames; and
      determine the AoP for the at least two frame pairs based on the position of the polarizer received at the FPGA from the motor controller, and
   wherein processing the at least two image frame pairs comprises adding a first frame of the first image frame pair to a first frame of the second image frame pair and subtracting a first frame of the first image frame pair from a second frame of the second image frame pair, the second image frame being consecutive with respect to the first image frame.

2. The object detection system of claim 1, wherein the second integrated circuit is integral with the processor.

3. The object detection system of claim 1, wherein the AoP and DoP are determined at a pixel level such that each pixel is analyzed.

4. The object detection system of claim 1, wherein the polarizer is delayed by 180-degrees of rotation by the motor controller to determine the AoP.

5. The object detection system of claim 1, wherein the polarizer is rotated by 360-degrees by the motor controller for each 0.5 seconds of search performed by the first integrated circuit.

6. The object detection system of claim 1, wherein the spatial filter is searching for targets having the DoP greater than 70%.

7. The object detection system of claim 1, wherein the first integrated circuit uses an image processing construct using cluster filters for contrast on each frame for 1-by-1-pixel clusters or 2-by-2-pixel clusters.

8. The object detection system of claim 1, wherein a shift in the AoP and the DoP measurement will indicate the level of target detection confidence.

9. A method comprising:
   spinning a polarizer, by a motor controller, at a rate that is slightly out of phase with respect to an image frame rate of a digital read-out integrated circuit (DROIC) imager;
   acquiring a plurality of image frame pairs by the DROIC imager, each image frame pair having a first image frame and a second image frame;
   determining a degree of polarization (DoP) and an angle of polarization (AoP) for each image frame pair using a field-programmable gate array (FPGA) wherein the FPGA is configured to:
      determine the DoP by processing at least two image frame pairs of the plurality of image frame pairs; and
      determine the AoP for the at least two image frame pairs based on the position of the polarizer received at the FPGA from the motor controller, and
   wherein processing the at least two image frame pairs comprises adding a first frame of the first image frame pair to a first frame of the second image frame pair and subtracting a first frame of the first image frame pair from a second frame of the second image frame pair, the second image frame being consecutive with respect to the first image frame;

applying a spatial filter to both the DoP and AoP for each image frame pair to provide filtered images; and searching the filtered images based on an amplitude of pixels relative to neighboring pixels to identify the pixels with a higher DoP relative to the neighboring pixels to identify a target.

10. The method of claim 9, wherein determining the AoP for each image frame pair is based on the position of the polarizer.

11. The method of claim 9, further comprising delaying the polarizer by 180-degrees of rotation with respect to an image acquisition rate of the imager of the first integrated circuit.

12. An object detection system comprising:
a digital read-out integrated circuit (DROIC) configured to measure scene data collected from a polarized image scene in which each image frame pair of the scene data from the polarized image scene is collected at two different and orthogonal polarizations;
a second integrated circuit configured to determine a degree of polarization (DoP) and an angle of polarization (AoP) for each image frame pair, to apply spatial filtering to the DoP and AoP for each image frame pair, and to generate pre-processed data as a result of the spatial filtering; and
a processor configured to match the pre-processed data to target criteria,
wherein the second integrated circuit comprises a field-programmable gate array (FPGA), wherein the second integrated circuit is configured to:

determine the DoP by processing at least two image frame pairs of the plurality of image frames, the processing including adding a first frame of the first image frame pair to a first frame of the second image frame pair and subtracting a first frame of the first image frame pair from a second frame of the second image frame pair; and determine the AoP for the at least two frame pairs based on the position of a polarizer received at the second integrated circuit integrated circuit, wherein processing the at least two image frame pairs comprises adding a first frame of the first image frame pair to a first frame of the second image frame pair and subtracting a first frame of the first image frame pair from a second frame of the second image frame pair, the second image frame being consecutive with respect to the first image frame.

13. The object detection system of claim 12, further comprising:
a polarizer configured to polarize an incoming image scene, and to generate the polarized image scene;
a motor controller configured to control a spin rate of the polarizer; and
a lens configured to collect the scene data from the polarized image scene, the scene data including a plurality of image frames.

14. The object detection system of claim 12, wherein the polarizer is delayed by 180-degrees by the motor controller of rotation to generate the AoP.

15. The object detection system of claim 1, wherein the spatial filter is searching for targets that meet an expected dimension or targets where the AoP is unique with respect to immediate surroundings of the AoP.

* * * * *